United States Patent
Yasui et al.

(10) Patent No.: US 9,139,710 B2
(45) Date of Patent: Sep. 22, 2015

(54) ALIPHATIC POLYESTER RESIN COMPOSITIONS, MOLDED ARTICLES OF ALIPHATIC POLYESTER RESIN AND METHOD OF PRODUCING SAME

(75) Inventors: Mamoru Yasui, Gamagori (JP); Tatsuhiko Osaki, Gamagori (JP); Takeshi Kanamori, Toyota (JP); Yasumasa Horibe, Toyota (JP); Hisashi Okuyama, Aichi (JP); Naomi Okuyama, legal representative, Mibutsuji-machi (JP)

(73) Assignee: Takemoto Yushi Kabushiki Kaisha, Gamagori, Aichi (JP)

( * ) Notice: Subject to any disclaimer, the term of this patent is extended or adjusted under 35 U.S.C. 154(b) by 2153 days.

(21) Appl. No.: 10/585,687

(22) PCT Filed: Jan. 13, 2005

(86) PCT No.: PCT/JP2005/000268
§ 371 (c)(1),
(2), (4) Date: Mar. 23, 2007

(87) PCT Pub. No.: WO2005/068554
PCT Pub. Date: Jul. 28, 2005

(65) Prior Publication Data
US 2007/0270535 A1    Nov. 22, 2007

(30) Foreign Application Priority Data

Jan. 20, 2004   (JP) .................................. 2004-011308

(51) Int. Cl.
*C08K 5/42* (2006.01)
*C08K 5/00* (2006.01)
C08G 63/91 (2006.01)

(52) U.S. Cl.
CPC ................. *C08K 5/0083* (2013.01); *C08K 5/42* (2013.01)

(58) Field of Classification Search
CPC ......... C08L 67/04; C08K 5/0083; C08K 5/42
USPC .......... 525/418, 419, 437; 524/157, 158, 161, 524/162
See application file for complete search history.

(56) References Cited

U.S. PATENT DOCUMENTS

2005/0027098 A1 * 2/2005 Hayes ........................... 528/272

FOREIGN PATENT DOCUMENTS

| EP | 0 780 428 | 4/2006 |
| GB | 1 451 945 | 10/1976 |
| JP | 2001-323052 | * 11/2001 |
| JP | 2002-080701 | * 3/2002 |

* cited by examiner

*Primary Examiner* — Ling Choi
*Assistant Examiner* — Gennadiy Mesh
(74) *Attorney, Agent, or Firm* — Weaver Austin Villeneuve & Sampson LLP

(57) ABSTRACT

An aliphatic polyester resin composition, useful for producing molded articles without causing deformation at the mold release time, has a non-copolymerized mixture of an aliphatic polyester resin including one or more polylactic acid resins and a crystallization nucleating agent including one or more metal salts of an aromatic sulfonate of Formula 1:

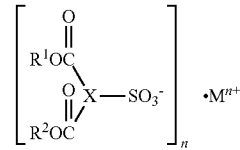

where X is a residual group obtained by removing three hydrogen atoms from benzene, R1 and R2 are each hydrocarbon group with 1-6 carbon atoms, M is one or more selected from the group of potassium atom, rubidium atom, barium atom, strontium atom and calcium atom, and n is 1 if M is alkali metal atom and 2 if M is alkali earth metal atom; the aliphatic polyester resin composition contains 0.01-5 weight parts of the one or more metal salts of aromatic sulfonate shown by Formula 1 for 100 weight parts of the aliphatic polyester resin.

1 Claim, No Drawings ating agent for crystallization or also some other additives, if necessary, when used for molding. This invention relates to improvements in the production method of such aliphatic polyester resin compositions.
ALIPHATIC POLYESTER RESIN COMPOSITIONS, MOLDED ARTICLES OF ALIPHATIC POLYESTER RESIN AND METHOD OF PRODUCING SAME This application is a continuation of International Application No. PCT/JP2005/000268, filed Jan. 13, 2005 which claims priority on Japanese Patent Application 2004-11308 filed Jan. 20, 2004.

BACKGROUND OF THE INVENTION

This invention relates to aliphatic polyester resin compositions, molded articles of aliphatic polyester resin and methods of their production.

From the point of view of protection of natural environment, biodegradable resins and molded articles produced from them are recently coming to be considered desirable, and aliphatic polyester resins such as polylactic acid resins and their molded articles are coming to be particularly noted. Although many of aliphatic polyester resins are essentially crystalline resins, they are slow to crystallize and behave nearly like a non-crystalline resin at the time of molding such that molded articles produced from them have many problems. In view of these problems, therefore, aliphatic polyester resins are usually presented in the form of aliphatic polyester resin compositions with a nucleating agent for crystallization or also some other additives, if necessary, when used for molding. This invention relates to improvements in the production method of such aliphatic polyester resin compositions.

Known prior art examples of nucleating agent to be contained in aliphatic polyester resin for producing an aliphatic polyester resin composition include: (1) compositions with melting point at 40-300° C. selected from amides of aliphatic carboxylic acid, amides of aliphatic bis-carboxylic acid, N-substituted bis-amides of aliphatic carboxylic acid and N-substituted ureas (as disclosed, for example, in Japanese Patent Publication JP1997-278991); (2) aromatic amide compounds such as trimesic acid-tris-(t-butyl amide), 1,4-cyclohexane dicarboxylic acid dianilide, 2,6-nephthalene dicarboxylic acid dichlorohexyl amide, N,N'-dibenzoyl-1,4-diamino cyclohexane and N,N'-dicyclohexane carbonyl-1,5-diaminonaphthalene (as disclosed, for example, in Japanese Patent Publication JP1998-87975); (3) organic compounds with melting point or softening point 80-300° C. and having specified melt-entropy (as disclosed, for example, in Japanese Patent Publication JP1999-5849); (4) metal salts of organic phosphate ester and basic inorganic aluminum compounds (as disclosed, for example, in Japanese Patent Publication JP2003-192883); (5) p-toluene sulfonic acid and its metallic salts (as disclosed, for example, in Japanese Patent Publications JP1996-120165 and JP1999-240962); (6) sodium sulfoisophthalate (as disclosed, for example, in Japanese Patent Publication JP2003-240962); and (7) inorganic particles such as talc (as disclosed, for example, in Japanese Patent Publication JP1996-3432). These prior art aliphatic polyester resin compositions, however, still have the same problems in that they are slow in crystallization and hence it takes a long time at a relatively high temperature for the molding process. Moreover, the molded products made from them are likely to undergo deformation at the time of mold releasing, and the physical characteristics of these molded products are inferior.

SUMMARY OF THE INVENTION

It is therefore an object of this invention to provide aliphatic polyester resin compositions from which molded articles with superior physical characteristics can be obtained under molding conditions that are practically like those for general resins without causing deformations at the time of mold releasing, as well as molded articles produced by using such aliphatic polyester resin compositions and their production methods.

This invention is based on the discovery by the present inventors as a result of their investigations that aliphatic polyester resin compositions containing a specified kind of metal salt of aromatic sulfonate should be used as nucleating agent for crystallization.

DETAILED DESCRIPTION OF THE INVENTION

This invention relates to aliphatic polyester resin compositions containing aliphatic polyester resin and one or more metal salts of aromatic sulfonate shown below (hereinafter referred to as Formula 1) as nucleating agent for crystallization:

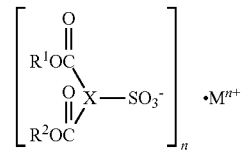

where X is a residual group obtained by removing three hydrogen atoms from benzene, $R^1$ and $R^2$ are each hydrocarbon group with 1-6 carbon atoms, M is alkali metal atom or alkali earth metal atom, and n is 1 if M is alkali metal atom and 2 if M is alkali earth metal atom.

This invention relates also to molded articles of aliphatic polyester resin obtained by melt-molding aforementioned aliphatic polyester resin compositions according to this invention.

This invention further relates to a method of producing molded articles of aliphatic polyester resin by melting aliphatic polyester resin composition of this invention, placing it inside a mold set at a temperature below the crystallization-initiating temperature by differential scanning calorimetry and above the glass transition temperature and molding while causing it to crystallize.

Aliphatic polyester resin compositions according to this invention (hereinafter referred to simply as the compositions of this invention) are described next. The compositions of this invention are characterized as being an aliphatic polyester resin and a nucleating agent for crystallization which contains one or more metal salts of aromatic sulfonate shown by Formula 1. Examples of metal salt of aromatic sulfonate shown by Formula 1 include: (1) alkali metal salts of sulfo-phthalic acid-dialkyl ester; (2) alkali metal salts of sulfo-isophthalic acid-dialkyl ester; (3) alkali metal salts of sulfo-terephthalic acid-dialkyl ester; (4) alkali earth metal salts of sulfo-phthalic acid-dialkyl ester; (5) alkali earth metal salts of sulfo-isophthalic acid-dialkyl ester; (6) alkali earth metal salts of sulfo-terephthalic acid-dialkyl ester; and (7) any mixtures of (1)-(6).

Regarding the metal salts of aromatic sulfonate shown by Formula 1, X is a residual group obtained by removing three hydrogen atoms from benzene. $R^1$ and $R^2$ are each hydrocarbon group with 1-6 carbon atoms such as methyl group, ethyl group, propyl group, isopropyl group, isobutyl group, pentyl group, hexyl group, cyclopentyl group, cyclohexyl group, allyl group and cyclohexenyl group. Among these, aliphatic hydrocarbon groups with 1-3 carbon atoms are preferable. M in Formula 1 may be (1) alkali metal atom such as lithium atom, sodium atom, potassium atom, rubidium atom and cesium atom, or (2) alkali earth metal atom such as beryllium atom, magnesium atom, calcium atom, strontium atom and barium atom. Among these, potassium atom, rubidium atom, barium atom and strontium atom are preferred. Potassium atom and barium atom are even more preferred.

Regarding the metal salts of aromatic sulfonate shown by Formula 1, examples of alkali metal salt of sulfo-phthalic acid-dialkyl ester include: (1) lithium salts of sulfo-phthalic acid-dialkyl ester such as 4-lithium sulfo-phthalic acid dimethyl ester, 4-lithium sulfo-phthalic acid diethyl ester, 4-lithium sulfo-phthalic acid di-n-propyl ester, 4-lithium sulfo-phthalic acid diisopropyl ester, 4-lithium sulfo-phthalic acid di-n-butyl ester, 4-lithium sulfo-phthalic acid diisobutyl ester, 4-lithium sulfo-phthalic acid di-t-butyl ester, 4-lithium sulfo-phthalic acid di-2-methylpropyl ester, 4-lithium sulfo-phthalic acid di-n-pentyl ester, 4-lithium sulfo-phthalic acid di-3-methylbutyl ester, 4-lithium sulfo-phthalic acid di-2-methylbutyl ester, 4-lithium sulfo-phthalic acid di-2,2-dimethylpropyl ester, 4-lithium sulfo-phthalic acid di-n-hexyl ester, 4-lithium sulfo-phthalic acid di-4-methylpentyl ester, 4-lithium sulfo-phthalic acid di-3,3-dimethylbutyl ester, 4-lithium sulfo-phthalic acid di-2,3-dimethylbutyl ester, and 4-lithium sulfo-phthalic acid dicyclohexyl ester; (2) sodium salts of sulfo-phthalic acid-dialkyl ester such as 4-sodium sulfo-phthalic acid dimethyl ester, 4-sodium sulfo-phthalic acid diethyl ester, 4-sodium sulfo-phthalic acid di-n-propyl ester, 4-sodium sulfo-phthalic acid diisopropyl ester, 4-sodium sulfo-phthalic acid di-n-butyl ester, 4-sodium sulfo-phthalic acid diisobutyl ester, 4-sodium sulfo-phthalic acid di-t-butyl ester, 4-sodium sulfo-phthalic acid di-2-methylpropyl ester, 4-sodium sulfo-phthalic acid di-n-pentyl ester, 4-sodium sulfo-phthalic acid di-3-methylbutyl ester, 4-sodium sulfo-phthalic acid di-2-methylbutyl ester, 4-sodium sulfo-phthalic acid di-2,2-dimethylpropyl ester, 4-sodium sulfo-phthalic acid di-n-hexyl ester, 4-sodium sulfo-phthalic acid di-2-methylpentyl ester, 4-sodium sulfo-phthalic acid di-3-methylpentyl ester, 4-sodium sulfo-phthalic acid di-4-methylpentyl ester, 4-sodium sulfo-phthalic acid di-3,3-dimethylbutyl ester, 4-sodium sulfo-phthalic acid di-2,3-dimethylbutyl ester, and 4-sodium sulfo-phthalic acid dicyclohexyl ester; (3) potassium salts of sulfo-phthalic acid-dialkyl ester such as 4-potassium sulfo-phthalic acid dimethyl ester, 4-potassium sulfo-phthalic acid diethyl ester, 4-potassium sulfo-phthalic acid di-n-propyl ester, 4-potassium sulfo-phthalic acid diisopropyl ester, 4-potassium sulfo-phthalic acid di-n-butyl ester, 4-potassium sulfo-phthalic acid diisobutyl ester, 4-potassium sulfo-phthalic acid di-t-butyl ester, 4-potassium sulfo-phthalic acid di-2-methylpropyl ester, 4-potassium sulfo-phthalic acid di-n-pentyl ester, 4-potassium sulfo-phthalic acid di-3-methylbutyl ester, 4-potassium sulfo-phthalic acid di-2-methylbutyl ester, 4-potassium sulfo-phthalic acid di-2,2-dimethylpropyl ester, 4-potassium sulfo-phthalic acid di-n-hexyl ester, 4-potassium sulfo-phthalic acid di-2-methylpentyl ester, 4-potassium sulfo-phthalic acid di-3-methylpentyl ester, 4-potassium sulfo-phthalic acid di-4-methylpentyl ester, 4-potassium sulfo-phthalic acid di-3,3-dimethylbutyl ester, 4-potassium sulfo-phthalic acid di-2,3-dimethylbutyl ester, and 4-potassium sulfo-phthalic acid dicyclohexyl ester; and (4) cesium salts of sulfo-phthalic acid-dialkyl ester such as 4-cesium sulfo-phthalic acid dimethyl ester, 4-cesium sulfo-phthalic acid diethyl ester, 4-cesium sulfo-phthalic acid di-n-propyl ester, 4-cesium sulfo-phthalic acid diisopropyl ester, 4-cesium sulfo-phthalic acid di-n-butyl ester, 4-cesium sulfo-phthalic acid diisobutyl ester, 4-cesium sulfo-phthalic acid di-t-butyl ester, 4-cesium sulfo-phthalic acid di-2-methylpropyl ester, 4-cesium sulfo-phthalic acid di-n-pentyl ester, 4-cesium sulfo-phthalic acid di-3-methylbutyl ester, 4-cesium sulfo-phthalic acid di-2-methylbutyl ester, 4-cesium sulfo-phthalic acid di-2,2-dimethylpropyl ester, 4-cesium sulfo-phthalic acid di-2-methylpentyl ester, 4-cesium sulfo-phthalic acid di-3-methylpentyl ester, 4-cesium sulfo-phthalic acid di-4-methylpentyl ester, 4-cesium sulfo-phthalic acid di-3,3-dimethylbutyl ester, 4-cesium sulfo-phthalic acid di-2,3-dimethylbutyl ester, and 4-cesium sulfo-phthalic acid dicyclohexyl ester.

Regarding the metal salts of aromatic sulfonate shown by Formula 1, examples of alkali metal salt of sulfo-isophthalic acid-dialkyl ester include: (1) lithium salts of sulfo-isophthalic acid-dialkyl ester such as 5-lithium sulfo-isophthalic acid dimethyl ester, 5-lithium sulfo-isophthalic acid diethyl ester, 5-lithium sulfo-isophthalic acid di-n-propyl ester, 5-lithium sulfo-isophthalic acid diisopropyl ester, 5-lithium sulfo-isophthalic acid di-n-butyl ester, 5-lithium sulfo-isophthalic acid diisobutyl ester, 5-lithium sulfo-isophthalic acid di-t-butyl ester, 5-lithium sulfo-isophthalic acid di-2-methylpropyl ester, 5-lithium sulfo-isophthalic acid di-n-pentyl ester, 5-lithium sulfo-isophthalic acid di-3-methylbutyl ester, 5-lithium sulfo-isophthalic acid di-2-methylbutyl ester, 5-lithium sulfo-isophthalic acid di-2,2-dimethylpropyl ester, 5-lithium sulfo-isophthalic acid di-4-methylpentyl ester, 5-lithium sulfo-isophthalic acid di-3,3-methylbutyl ester, 5-lithium sulfo-isophthalic acid di-2,3-methylbutyl ester, and 5-lithium sulfo-isophthalic acid dicyclohexyl ester; (2) sodium salts of sulfo-isophthalic acid-dialkyl ester such as 5-sodium sulfo-isophthalic acid dimethyl ester, 5-sodium sulfo-isophthalic acid diethyl ester, 5-sodium sulfo-isophthalic acid di-n-propyl ester, 5-sodium sulfo-isophthalic acid diisopropyl ester, 5-sodium sulfo-isophthalic acid di-n-butyl ester, 5-sodium sulfo-isophthalic acid diisobutyl ester, 5-sodium sulfo-isophthalic acid di-t-butyl ester, 5-sodium sulfo-isophthalic acid di-2-methylpropyl ester, 5-sodium sulfo-isophthalic acid di-n-pentyl ester, 5-sodium sulfo-isophthalic acid di-3-methylbutyl ester, 5-sodium sulfo-isophthalic acid di-2-methylbutyl ester, 5-sodium sulfo-isophthalic acid di-2,2-dimethylpropyl ester, 5-sodium sulfo-isophthalic acid di-2-methylpentyl ester, 5-sodium sulfo-isophthalic acid di-3-methylpentyl ester, 5-sodium sulfo-isophthalic acid di-4-methylpentyl ester, 5-sodium sulfo-isophthalic acid di-3,3-methylbutyl ester, 5-sodium sulfo-isophthalic acid di-2,3-methylbutyl ester, and 5-sodium sulfo-isophthalic acid dicyclohexyl ester; (3) potassium salts of sulfo-isophthalic acid-dialkyl ester such as 5-potassium sulfo-isophthalic acid dimethyl ester, 5-potassium sulfo-isophthalic acid diethyl ester, 5-potassium sulfo-isophthalic acid di-n-propyl ester, 5-potassium sulfo-isophthalic acid diisopropyl ester, 5-potassium sulfo-isophthalic acid di-n-butyl ester, 5-potassium sulfo-isophthalic acid diisobutyl ester, 5-potassium sulfo-isophthalic acid di-t-butyl ester, 5-potassium sulfo-isophthalic acid di-2-methylpropyl ester, 5-potassium sulfo-isophthalic acid di-n-pentyl ester, 5-potassium sulfo-isophthalic acid di-3-methylbutyl ester, 5-potassium sulfo-isophthalic acid di-2-methylbutyl ester, 5-potassium sulfo-isophthalic acid di-2,2-dimethylpropyl ester, 5-potassium sulfo-isophthalic acid di-2-methylpentyl ester, 5-potassium sulfo-isophthalic acid di-3-methylpentyl ester, 5-potassium sulfo-isophthalic acid di-4-methylpentyl ester, 5-potassium sulfo-isophthalic acid di-3,3-methylbutyl ester, 5-potassium sulfo-isophthalic acid di-2,3-methylbutyl ester, and 5-potassium sulfo-isophthalic acid dicyclohexyl ester; and (4) cesium salts of sulfo-isophthalic acid-dialkyl ester such as 5-cesium sulfo-isophthalic acid dimethyl ester, 5-cesium sulfo-isophthalic acid diethyl ester, 5-cesium sulfo-isophthalic acid di-n-propyl ester, 5-cesium sulfo-isophthalic acid diisopropyl ester, 5-cesium sulfo-isophthalic acid di-n-butyl ester, 5-cesium sulfo-isophthalic acid diisobutyl ester, 5-cesium sulfo-isophthalic acid di-t-butyl ester, 5-cesium sulfo-isophthalic acid di-2-methylpropyl ester, 5-cesium sulfo-isophthalic acid di-n-pentyl ester, 5-cesium sulfo-isophthalic acid di-3-methylbutyl ester, 5-cesium sulfo-isophthalic acid di-2-methylbutyl ester, 5-cesium sulfo-isophthalic acid di-2,2-dimethylpropyl ester, 5-cesium sulfo-isophthalic acid di-2-methylpentyl ester, 5-cesium sulfo-isophthalic acid di-3-methylpentyl ester, 5-cesium sulfo-isophthalic acid di-4-methylpentyl ester, 5-cesium sulfo-isophthalic acid di-3,3-methylbutyl ester, 5-cesium sulfo-isophthalic acid di-2,3-methylbutyl ester, and 5-cesium sulfo-isophthalic acid dicyclohexyl ester.

Regarding the metal salts of aromatic sulfonate shown by Formula 1, examples of alkali metal salt of sulfo-terephthalic acid-dialkyl ester include: (1) lithium salts of sulfo-terephthalic acid-dialkyl ester such as lithium sulfo-terephthalic acid dimethyl ester, lithium sulfo-terephthalic acid dimethyl ester, lithium sulfo-terephthalic acid diethyl ester, lithium sulfo-terephthalic acid di-n-propyl ester, lithium sulfo-terephthalic acid diisopropyl ester, lithium sulfo-terephthalic acid di-n-butyl ester, lithium sulfo-terephthalic acid diisobutyl ester, lithium sulfo-terephthalic acid di-t-butyl ester, lithium sulfo-terephthalic acid di-2-methylpropyl ester, lithium sulfo-terephthalic acid di-n-pentyl ester, lithium sulfo-terephthalic acid di-3-methylbutyl ester, lithium sulfo-terephthalic acid di-2-methylbutyl ester, lithium sulfo-terephthalic acid di-2,2-dimethylpropyl ester, lithium sulfo-terephthalic acid di-4-methylpentyl ester, lithium sulfo-terephthalic acid di-3,3-dimethylbutyl ester, lithium sulfo-terephthalic acid di-2,3-dimethylbutyl ester, and lithium sulfo-terephthalic acid dicyclohexyl ester; (2) sodium salts of sulfo-terephthalic acid-dialkyl ester such as sodium sulfo-terephthalic acid dimethyl ester, sodium sulfo-terephthalic acid dimethyl ester, sodium sulfo-terephthalic acid diethyl ester, sodium sulfo-terephthalic acid di-n-propyl ester, sodium sulfo-terephthalic acid diisopropyl ester, sodium sulfo-terephthalic acid di-n-butyl ester, sodium sulfo-terephthalic acid diisobutyl ester, sodium sulfo-terephthalic acid di-t-butyl ester, sodium sulfo-terephthalic acid di-2-methylpropyl ester, sodium sulfo-terephthalic acid di-n-pentyl ester, sodium sulfo-terephthalic acid di-3-methylbutyl ester, sodium sulfo-terephthalic acid di-2-methylbutyl ester, sodium sulfo-terephthalic acid di-2,2-dimethylpropyl ester, sodium sulfo-terephthalic acid di-2-methylpentyl ester, sodium sulfo-terephthalic acid di-3-methylpentyl ester, sodium sulfo-terephthalic acid di-4-methylpentyl ester, sodium sulfo-terephthalic acid di-3,3-dimethylbutyl ester, sodium sulfo-terephthalic acid di-2,3-dimethylbutyl ester, and sodium sulfo-terephthalic acid dicyclohexyl ester; (3) potassium salts of sulfo-terephthalic acid-dialkyl ester such as potassium sulfo-terephthalic acid dimethyl ester, potassium sulfo-terephthalic acid diethyl ester, potassium sulfo-terephthalic acid di-n-propyl ester, potassium sulfo-terephthalic acid diisopropyl ester, potassium sulfo-terephthalic acid di-n-butyl ester, potassium sulfo-terephthalic acid diisobutyl ester, potassium sulfo-terephthalic acid di-t-butyl ester, potassium sulfo-terephthalic acid di-2-methylpropyl ester, potassium sulfo-terephthalic acid di-n-pentyl ester, potassium sulfo-terephthalic acid di-3-methylbutyl ester, potassium sulfo-terephthalic acid di-2-methylbutyl ester, potassium sulfo-terephthalic acid di-2,2-dimethylpropyl ester, potassium sulfo-terephthalic acid di-n-hexylpropyl ester, potassium sulfo-terephthalic acid di-2-methylpentyl ester, potassium sulfo-terephthalic acid di-3-methylpentyl ester, potassium sulfo-terephthalic acid di-4-methylpentyl ester, potassium sulfo-terephthalic acid di-3,3-dimethylbutyl ester, potassium sulfo-terephthalic acid di-2,3-dimethylbutyl ester, and potassium sulfo-terephthalic acid dicyclohexyl ester; and (4) cesium salts of sulfo-terephthalic acid-dialkyl ester such as cesium sulfo-terephthalic acid dimethyl ester, cesium sulfo-terephthalic acid diethyl ester, cesium sulfo-terephthalic acid di-n-propyl ester, cesium sulfo-terephthalic acid diisopropyl ester, cesium sulfo-terephthalic acid di-n-butyl ester, cesium sulfo-terephthalic acid diisobutyl ester, cesium sulfo-terephthalic acid di-t-butyl ester, cesium sulfo-terephthalic acid di-2-methylpropyl ester, cesium sulfo-terephthalic acid di-n-pentyl ester, cesium sulfo-terephthalic acid di-3-methylbutyl ester, cesium sulfo-terephthalic acid di-2-methylbutyl ester, cesium sulfo-terephthalic acid di-2,2-dimethylpropyl ester, cesium sulfo-terephthalic acid di-2-methylpentyl ester, cesium sulfo-terephthalic acid di-3-methylpentyl ester, cesium sulfo-terephthalic acid di-4-methylpentyl ester, cesium sulfo-terephthalic acid di-3,3-dimethylbutyl ester, cesium sulfo-terephthalic acid di-2,3-dimethylbutyl ester, and cesium sulfo-terephthalic acid dicyclohexyl ester.

Regarding the metal salts of aromatic sulfonate shown by Formula 1, examples of alkali earth metal salt of sulfo-phthalic acid-dialkyl ester include: (1) magnesium salts of sulfo-phthalic acid-dialkyl ester such as bis(4-sulfo-phthalic acid dimethyl ester) magnesium salt, bis(4-sulfo-phthalic acid diethyl ester) magnesium salt, bis(4-sulfo-phthalic acid di-n-propyl ester) magnesium salt, bis(4-sulfo-phthalic acid diisobutyl ester) magnesium salt, bis(4-sulfo-phthalic acid di-n-butyl ester) magnesium salt, bis(4-sulfo-phthalic acid diisobutyl ester) magnesium salt, bis(4-sulfo-phthalic acid di-t-butyl ester) magnesium salt, bis(4-sulfo-phthalic acid di-2-methylpropyl ester) magnesium salt, bis(4-sulfo-phthalic acid di-n-pentyl ester) magnesium salt, bis(4-sulfo-phthalic acid di-3-methylbutyl ester) magnesium salt, bis(4-sulfo-phthalic acid di-2-methylbutyl ester) magnesium salt, bis(4-sulfo-phthalic acid di-2,2-dimethylpropyl ester) magnesium salt, bis(4-sulfo-phthalic acid di-4-methylpentyl ester) magnesium salt, bis(4-sulfo-phthalic acid di-3,3-dimethylbutyl ester) magnesium salt, bis(4-sulfo-phthalic acid di-2,3-dimethybutyl ester) magnesium salt, and bis(4-sulfo-phthalic acid dicyclohexyl ester) magnesium salt; (2) calcium salts of sulfo-phthalic acid-dialkyl ester such as bis(4-sulfo-phthalic acid dimethyl ester) calcium salt, bis(4-sulfo-phthalic acid diethyl ester) calcium salt, bis(4-sulfo-phthalic acid di-n-propyl ester) calcium salt, bis(4-sulfo-phthalic acid diisopropyl ester) calcium salt, bis(4-sulfo-phthalic acid di-n-butyl ester) calcium salt, bis(4-sulfo-phthalic acid diisobutyl ester) calcium salt, bis(4-sulfo-phthalic acid di-t-butyl ester) calcium salt, bis(4-sulfo-phthalic acid di-2-methylpropyl ester) calcium salt, bis(4-sulfo-phthalic acid di-n-pentyl ester) calcium salt, bis(4-sulfo-phthalic acid di-3-methylbutyl ester) calcium salt, bis(4-sulfo-phthalic acid di-2-methylbutyl ester) calcium salt, and bis(4-sulfo-phthalic acid di-2,2-dimethylpropyl ester) calcium salt, bis(4-sulfo-phthalic acid di-2-methylpentyl ester) calcium salt, bis(4-sulfo-phthalic acid di-3-methypentyl ester) calcium salt, bis(4-sulfo-phthalic acid di-4-methylpentyl ester) calcium salt, bis(4-sulfo-phthalic acid di-3,3-dimethylbutyl ester) calcium salt, bis(4-sulfo-phthalic acid di-2,3-dimethybutyl ester) calcium salt, and bis(4-sulfo-phthalic acid dicyclohexyl ester) calcium salt; and (3) barium salts of sulfo-phthalic acid-dialkyl ester such as bis(4-sulfo-phthalic acid dimethyl ester) barium salt, bis(4-sulfo-phthalic acid diethyl ester) barium salt, bis(4-sulfo-phthalic acid di-n-propyl ester) barium salt, bis(4-sulfo-phthalic acid diisopropyl ester) barium salt, bis(4-sulfo-phthalic acid di-n-butyl ester) barium salt, bis(4-sulfophthalic acid diisobutyl ester) barium salt, bis(4-sulfo-phthalic acid di-t-butyl ester) barium salt, bis(4-sulfo-phthalic acid di-2-methylpropyl ester) barium salt, bis(4-sulfo-phthalic acid di-n-pentyl ester) barium salt, bis(4-sulfo-phthalic acid di-3-methylbutyl ester) barium salt, bis(4-sulfo-phthalic acid di-2-methylbutyl ester) barium salt, bis(4-sulfo-phthalic acid di-2,2-dimethylpropyl ester) barium salt, bis(4-sulfo-phthalic acid di-2-methylpentyl ester) barium salt, bis(4-sulfo-phthalic acid di-3-methypentyl ester) barium salt, bis(4-sulfo-phthalic acid di-4-methylpentyl ester) barium salt, bis(4-sulfo-phthalic acid di-3,3-dimethylbutyl ester) barium salt, bis(4-sulfo-phthalic acid di-2,3-dimethybutyl ester) barium salt, and bis(4-sulfo-phthalic acid dicyclohexyl ester) barium salt.

Regarding the metal salts of aromatic sulfonate shown by Formula 1, examples of alkali earth metal salt of sulfo-isophthalic acid-dialkyl ester include: (1) magnesium salts of sulfo-isophthalic acid-dialkyl ester such as bis(5-sulfo-isophthalic acid dimethyl ester) magnesium salt, bis(5-sulfo-isophthalic acid diethyl ester) magnesium salt, bis(5-sulfo-isophthalic acid di-n-propyl ester) magnesium salt, bis(5-sulfo-isophthalic acid diisopropyl ester) magnesium salt, bis(5-sulfo-isophthalic acid di-n-butyl ester) magnesium salt, bis(5-sulfo-isophthalic acid diisobutyl ester) magnesium salt, bis(5-sulfo-isophthalic acid di-t-butyl ester) magnesium salt, bis(5-sulfo-isophthalic acid di-2-methylpropyl ester) magnesium salt, bis(5-sulfo-isophthalic acid di-n-pentyl ester) magnesium salt, bis(5-sulfo-isophthalic acid di-3-methylbutyl ester) magnesium salt, bis(5-sulfo-isophthalic acid di-2-methylbutyl ester) magnesium salt, bis(5-sulfo-isophthalic acid di-2,2-dimethylpropyl ester) magnesium salt, bis(5-sulfo-isophthalic acid di-4-methylpentyl ester) magnesium salt, bis(5-sulfo-isophthalic acid di-3,3-dimethylbutyl ester) magnesium salt, bis(5-sulfo-isophthalic acid di-2,3-dimethylbutyl ester) magnesium salt, and bis(5-sulfo-isophthalic acid dicyclohexyl ester) magnesium salt; (2) calcium salts of sulfo-isophthalic acid-dialkyl ester such as bis(5-sulfo-isophthalic acid dimethyl ester) calcium salt, bis(5-sulfo-isophthalic acid diethyl ester) calcium salt, bis(5-sulfo-isophthalic acid di-n-propyl ester) calcium salt, bis(5-sulfo-isophthalic acid diisopropyl ester) calcium salt, bis(5-sulfo-isophthalic acid di-n-butyl ester) calcium salt, bis(5-sulfo-isophthalic acid diisobutyl ester) calcium salt, bis(5-sulfo-isophthalic acid di-t-butyl ester) calcium salt, bis(5-sulfo-isophthalic acid di-2-methylpropyl ester) calcium salt, bis(5-sulfo-isophthalic acid di-n-pentyl ester) calcium salt, bis(5-sulfo-isophthalic acid di-3-methylbutyl ester) calcium salt, bis(5-sulfo-isophthalic acid di-2-methylbutyl ester) calcium salt, bis(5-sulfo-isophthalic acid di-2,2-dimethylpropyl ester) calcium salt, bis(5-sulfo-isophthalic acid di-2-methypentyl ester) calcium salt, bis(5-sulfo-isophthalic acid di-3-methylpentyl ester) calcium salt, bis(5-sulfo-isophthalic acid di-4-methylpentyl ester) calcium salt, bis(5-sulfo-isophthalic acid di-3,3-dimethylbutyl ester) calcium salt, bis(5-sulfo-isophthalic acid di-2,3-dimethylbutyl ester) calcium salt, and bis(5-sulfo-isophthalic acid dicyclohexyl ester) calcium salt; and (3) barium salts of sulfo-isophthalic acid-dialkyl ester such as bis(5-sulfo-isophthalic acid dimethyl ester) barium salt, bis(5-sulfo-isophthalic acid diethyl ester) barium salt, bis(5-sulfo-isophthalic acid di-n-propyl ester) barium salt, bis(5-sulfo-isophthalic acid diisopropyl ester) barium salt, bis(5-sulfo-isophthalic acid di-n-butyl ester) barium salt, bis(5-sulfo-isophthalic acid diisobutyl ester) barium salt, bis(5-sulfo-isophthalic acid di-t-butyl ester) barium salt, bis(5-sulfo-isophthalic acid di-2-methylpropyl ester) barium salt, bis(5-sulfo-isophthalic acid di-n-pentyl ester) barium salt, bis(5-sulfo-isophthalic acid di-3-methylbutyl ester) barium salt, bis(5-sulfo-isophthalic acid di-2-methylbutyl ester) barium salt, bis(5-sulfo-isophthalic acid di-2,2-dimethylpropyl ester) barium salt, bis(5-sulfo-isophthalic acid di-2-methypentyl ester) barium salt, bis(5-sulfo-isophthalic acid di-3-methylpentyl ester) barium salt, bis(5-sulfo-isophthalic acid di-4-methylpentyl ester) barium salt, bis(5-sulfo-isophthalic acid di-3,3-dimethylbutyl ester) barium salt, bis(5-sulfo-isophthalic acid di-2,3-dimethylbutyl ester) barium salt, bis(5-sulfo-isophthalic acid dicyclohexyl ester) barium salt.

Regarding the metal salts of aromatic sulfonate shown by Formula 1, examples of alkali earth metal salt of sulfo-terephthalic acid-dialkyl ester include: (1) magnesium salts of sulfo-terephthalic acid-dialkyl ester such as bis(sulfo-terephthalic acid dimethyl ester) magnesium salt, bis(sulfo-terephthalic acid diethyl ester) magnesium salt, bis(sulfo-terephthalic acid di-n-propyl ester) magnesium salt, bis(sulfo-terephthalic acid diisopropyl ester) magnesium salt, bis(sulfo-terephthalic acid di-n-butyl ester) magnesium salt, bis(sulfo-terephthalic acid diisobutyl ester) magnesium salt, bis(sulfo-terephthalic acid di-t-butyl ester) magnesium salt, bis(sulfo-terephthalic acid di-2-methylpropyl ester) magnesium salt, bis(sulfo-terephthalic acid di-n-pentyl ester) magnesium salt, bis(sulfo-terephthalic acid di-3-methylbutyl ester) magnesium salt, bis(sulfo-terephthalic acid di-2-methylbutyl ester) magnesium salt, bis(sulfo-terephthalic acid di-2,2-dimethylpropyl ester) magnesium salt, bis(sulfo-terephthalic acid di-4-methylpentyl ester) magnesium salt, bis(sulfo-terephthalic acid di-3,3-dimethylbutyl ester) magnesium salt, bis(sulfo-terephthalic acid di-2,3-dimethylbutyl ester) magnesium salt, and bis(sulfo-terephthalic acid dicyclohexyl ester) magnesium salt; (2) calcium salts of sulfo-terephthalic acid-dialkyl ester such as bis(sulfo-terephthalic acid dimethyl ester) calcium salt, bis(sulfo-terephthalic acid diethyl ester) calcium salt, bis(sulfo-terephthalic acid di-n-propyl ester) calcium salt, bis(sulfo-terephthalic acid diisopropyl ester) calcium salt, bis(sulfo-terephthalic acid di-n-butyl ester) calcium salt, bis(sulfo-terephthalic acid diisobutyl ester) calcium salt, bis(sulfo-terephthalic acid di-t-butyl ester) calcium salt, bis(sulfo-terephthalic acid di-2-methylpropyl ester) calcium salt, bis(sulfo-terephthalic acid di-n-pentyl ester) calcium salt, bis(sulfo-terephthalic acid di-3-methylbutyl ester) calcium salt, bis(sulfo-terephthalic acid di-2-methylbutyl ester) calcium salt, bis(sulfo-terephthalic acid di-2,2-dimethylpropyl ester) calcium salt, bis(sulfo-terephthalic acid di-2-methylpentyl ester) calcium salt, bis(sulfo-terephthalic acid di-3-methylpentyl ester) calcium salt, bis(sulfo-terephthalic acid di-4-methylpentyl ester) calcium salt, bis(sulfo-terephthalic acid di-3,3-dimethylbutyl ester) calcium salt, bis(sulfo-terephthalic acid di-2,3-dimethylbutyl ester) calcium salt, and bis(sulfo-terephthalic acid dicyclohexyl ester) calcium salt; and (3) barium salts of sulfo-terephthalic acid-dialkyl ester such as bis(sulfo-terephthalic acid dimethyl ester) barium salt, bis(sulfo-terephthalic acid diethyl ester) barium salt, bis(sulfo-terephthalic acid di-n-propyl ester) barium salt, bis(sulfo-terephthalic acid diisopropyl ester) barium salt, bis(sulfo-terephthalic acid di-n-butyl ester) barium salt, bis(sulfo-terephthalic acid diisobutyl ester) barium salt, bis(sulfo-terephthalic acid di-t-butyl ester) barium salt, bis(sulfo-terephthalic acid di-2-methylpropyl ester) barium salt, bis(sulfo-terephthalic acid di-n-pentyl ester) barium salt, bis(sulfo-terephthalic acid di-3-methylbutyl ester) barium salt, bis(sulfo-terephthalic acid di-2-methylbutyl ester) barium salt, bis(sulfo-terephthalic acid di-2,2-dimethylpropyl ester) barium salt, bis(sulfo-terephthalic acid di-2-methylpentyl ester) barium salt, bis(sulfo-terephthalic acid di-3-methylpentyl ester) barium salt, bis(sulfo-terephthalic acid di-4-methylpentyl ester) barium salt, bis(sulfo-terephthalic acid di-3,3-dimethylbutyl ester) barium salt, bis(sulfo-terephthalic acid di-2,3-dimethylbutyl ester) barium salt, and bis(sulfo-terephthalic acid dicyclohexyl ester) barium salt.

These metal salts of aromatic sulfonate shown by Formula 1 described above can be synthesized by any known method such as described in Japanese Patent Publication JP1959-10497.

Aliphatic polyester resins used for the compositions of this invention are obtained from a material which comprises mainly aliphatic compounds that can form ester bonds (hereinafter referred to as ester-bond forming compounds), having within the molecule two or more functional groups that can form ester-bonds. Those containing constituent units made of ester-bond forming compounds by 60 molar % or more are preferable, those containing them by 80 molar % or more are more preferable and those containing by 90 molar % or more are even more preferable. Such aliphatic polyester resins can be obtained, for example, by (1) polycondensation reaction of aliphatic hydroxy carboxylic acid; (2) ring-opening polymerization of ring lactone; and (3) polycondensation of aliphatic dibasic acids and/or ester-bond forming compounds of aliphatic dibasic acid and aliphatic diol.

Many known kinds of aforementioned aliphatic hydroxy carboxylic acid may be used but aliphatic hydroxy carboxylic acids with 2-6 carbons atoms such as glycolic acid, lactic acid, 3-hydroxybutyric acid, 4-hydroxybutyric acid and 4-hydroxyvalerianic acid are preferable. Examples of aliphatic polyester resin obtained by polycondensation reaction of such aliphatic hydroxy carboxylic acid include polylactic acid, polyglycolic acid, poly-(3-hydroxybutyric acid), poly-(4-hydroxybutyric acid) and poly-(4-hydroxyvalerianic acid).

Many known kinds of aforementioned ring lactone may be used but ring lactones with 3-6 carbon atoms such as ε-propiolactone, δ-butyrolactone, β-butyrolactone, γ-butyrolactone, pivalolactone, δ-valerolactone and ε-caprolactone are preferable. Examples of aliphatic polyester resin obtainable by ring-opening polymerization of such ring lactone include poly-(ε-propiolactone), poly-(δ-butyrolactone), poly-(β-butyrolactone), poly-(γ-butyrolactone), poly-(pivalolactone), poly-(δ-valerolactone) and poly-(ε-caprolactone).

Many known kinds of aforementioned aliphatic dibasic acid may be used but aliphatic dicarboxylic acids with 4-22 carbon atoms such as succinic acid, adipic acid, azelaic acid, sebacic acid, α, ω-dodecan dicarboxylic acid, dodecenyl succinic acid, octadecenyl dicarboxylic acid and cyclohexane dicarboxylic acid are preferable. Many known kinds of aforementioned ester-bond forming compound of aliphatic dibasic acid may be used but ester-bond forming compounds of aliphatic dibasic acid with 4-22 carbon atoms such as dimethyl succinate, dimethyl adipinate, dimethyl azelanate and dimethyl sebacinate are preferable. Many known kinds of aforementioned aliphatic diol may be used but aliphatic diols with 2-8 carbon atoms such as ethylene glycol, 1,2-propane diol, 1,3-propane diol, 1,4-butane diol, 1,6-hexane diol, neopentyl glycol, 1,4-cyclohexane diol and cyclohexane dimethanol are preferable. Examples of aliphatic polyester resin obtainable by polycondensation reaction of such aliphatic dibasic acid and/or ester-bond forming compound of aliphatic dibasic acid and aliphatic diol include polyethylenesuccinate, polybutylenesuccinate, polyhexamethylenesuccinate, polyethyleneadipate, polybutyleneadipate, polyhexamethyleneadipate, polyethyleneoxalate, polybutyleneoxalate, polyhexamethyleneoxalate, polyethylenesebacate and polybutylenesebacate.

Aliphatic polyester resins that are used for the composition of this invention are obtained by using such aliphatic ester forming compounds as explained above as main material but aromatic ester forming compounds may be used as auxiliary material. Examples of such aromatic ester forming compound include aromatic dicarboxylic acids such as phthalic acid, isophthalic acid, terephthalic acid and naphthalene dicarboxylic acid, aromatic diols such as alkylene oxide adducts with 2-4 carbon atoms of bisphenols such as bis-(ortho, metha, para)-hydroxymethyl benzene, bisphenol A and bisphenol F, and hydroxy carboxylic acids such as alkylene oxide adducts with 2-4 carbons atoms of 4-hydroxy benzoic acid.

Among aliphatic polyester resins used for the compositions of this invention, those with weight average molecular weight (hereinafter as polystyrene converted value by gel permeation chromatographic analysis) 100000 or over are preferable, those with 120000 or over are more preferable and those with 150000-400000 are even more preferable. If the weight average molecular weight is less than 100000, molded articles obtained therefrom are not satisfactory in physical characteristics such as strength and elastic modulus, these physical characteristics tending to improve as the weight average molecular weight increases. If the weight average molecular weight of aliphatic polyester resins is 400000 or less, fluidity that is convenient for molding can be obtained.

Among aliphatic polyester resins used for the compositions of this invention, those containing remnant monomers by 5000 ppm or less are preferable, those containing by 2000 ppm or less are more preferable, those containing by 1000 ppm or less are even more preferable and those containing by 500 ppm or less are still even more preferable. Since these remnant monomers function as catalyst for hydrolysis, if they exceed 5000 ppm, conventional controlling agents against hydrolysis such as carbodiimide-based compounds, oxazoline-based compounds and isocyanate-based compounds may be added but are not sufficiently effective and resistance against deterioration by humidity and heat tends to become insufficient. Resistance against deterioration by humidity and heat tends to improve as the content of remnant monomers becomes lower.

Aliphatic polyester resins used for the compositions include single polymers obtained by using only one kind of aliphatic ester forming compound as the material, copolymers obtained by using one or more kinds of aliphatic ester forming compounds and compounds of another kind and mixtures of these single polymers and copolymers. In terms of arrangements, these copolymers may be random copolymers, alternate copolymers, block copolymers or graft copolymers.

Among the aliphatic polyester resins used for the compositions described above, examples of those that are preferable from the point of view of significantly improving crystallization include (1) polylactic acid resins containing structural units comprising lactic acid and/or lactides of lactic acid by 90 molar % or more, or preferably by 95% or more, and (2) polylactic acid based resins having structural units comprising lactic acid and/or lactides of lactic acid by 10 molar % or more and less than 90 molar % but polylactic resins are preferable.

Such polylactic acid resins comprise structural units formed with L-lactic acid and those formed with D-lactic acid at molar ratio of 100/0-0/100 but those containing structural units of either kind by 96 molar % or more are preferable and those containing those of either kind by 98 molar % or more are more preferable from the point of view of obtaining polylactic resins with a high melting point.

These polylactic acid resins themselves can be synthesized by any of known conventional methods which include: (1)

methods by direct dehydrating condensation of lactic acid and (2) methods by ring-opening polymerization of lactide of lactic acid such as described in Japanese Patent Publications JP1995-33861 and JP1884-96123 and Polymer Preprints, Japan, Vol. 44 (The Society of Polymer Science, Japan) 3198-3199. For the methods of (1) above, any lactic acid such as L-lactic acid, D-lactic acid, DL-lactic acid and their mixtures may be used. For the methods of (2) above, any lactide such as
L-lactide, D-lactide, DL-lactide, meso-lactide and their mixtures may be used. Any known method of synthesis may be used for the synthesis, refinement and polymerization of lactide as material such as the methods described in U.S. Pat. No. 4,057,537, Laid-open European Patent Application 261572, Polymer Bulletin, Vol. 14 (1985), 491-495, and Macromol. Chem., 187 (1986) 1611-1628.

Among the polylactic acid resins described above, those containing structural units comprising lactic acid and/or lactide of lactic acid by 25 molar % or more and less than 75 molar % are preferable and those containing structural units comprising lactic acid and/or lactide of lactic acid and other kinds of structural units at weight ratio of 10/90-90/10 and having glass transition temperature of 60° C. or below are more preferable. Such polylactic polyester resin is described in Japanese Patent Publication JP2001-335623 as a shock-resistance improving agent and is commercially available, for example, as Plamate PD150 and Plamate PD350 (trade names, produced by Dainippon Ink and Chemicals, Inc.)

When polylactic acid resin and polylactic acid based resin are mixed as aliphatic polyester resin for the compound of this invention, the ratio of polylactic acid based resin in the mixture is preferably 5-50 weight % and more preferably 10-40 weight %. If this ratio is below 5 weight %, the effect of improvement in shock-resistance is reduced. If it exceeds 50 weight %, on the other hand, the effect on improving heat resistance is adversely affected.

Polylactic acid resins and polylactic acid based resins have been described above as examples of aliphatic polyester resins used for the compounds of this invention, the statements given above regarding weight average molecular weight and remnant monomers also apply similarly to these aliphatic polyester resins.

In the compound of this invention, the content of aliphatic polyester resin is preferably 60 weight % or over and more preferably 80 weight % or over. The content of salt of aromatic sulfonate shown by Formula 1 as nucleating agent for crystallization is preferably 0.0001-20 weight parts, more preferably 0.01-5 weight parts and even more preferably 0.1-3 weight parts against 100 weight parts of aliphatic polyester resin. They are all for the purpose of obtaining a sufficient effect of adding the salt of aromatic sulfonate shown by Formula 1 as nucleating agent for crystallization.

As explained above, many different kinds are included as the compound of this invention. Among these, however, those with the crystallization peak temperature of 100-150° C. by differential scanning calorimetry and having heat of crystallization 20 J/g or greater are preferable because molding can be carried out smoothly and molded articles with superior physical characteristics can be obtained by using such compositions of this invention.

The compounds of this invention contain not only salts of aromatic sulfonate shown by Formula 1 as nucleating agent for crystallization but also organic and/or inorganic nucleating agents of known kinds for crystallization. Among such organic nucleating agents for crystallization, aliphatic amides and aromatic amides are preferable and their content is preferably about the same or less than that of the salts of aromatic sulfonate shown by Formula 1. Among inorganic nucleating agents for crystallization, talc is preferable and its content is preferably 1-20 weight parts to 100 weight parts of aliphatic polyester resin.

Depending on the purpose of use, other additives may be contained by the compounds of this invention. Examples of such other additives that may be contained include plasticizers, anti-oxidants, heat stabilizers, light stabilizers, ultraviolet absorbents, pigments, coloring agents, fillers of all kinds, antistatic agents, mold releasing agents, perfumes, lubricants, flame retardants, foaming agents and anti-bacterial/fungal agents.

The compounds of this invention as described above can be prepared by any of known methods including: (1) method of simultaneously dry-blending aliphatic polyester resin and a nucleating agent for crystallization in powder or pellet form and, if necessary, other additives and thereafter mixing them together; and (2) method of pre-blending aliphatic polyester resin and a nucleating agent for crystallization in powder or pellet form and, if necessary, dry-blending other additives and thereafter mixing them together. Examples of apparatus to be used for such dry-blending include mill rolls, Bambury mixers and super mixers. Examples of apparatus for mixing include extruders with single shaft and double shafts. The mixing temperature by the mixing apparatus is usually about 120-220° C. The nucleating agent for crystallization and other additives may be added at the stage of polymerization of aliphatic polyester. A master batch containing the nucleating agent for crystallization and other additives at a high concentration may be preliminarily prepared and added to aliphatic polyester resin.

Molded articles of aliphatic polyester resin according to this invention (hereinafter referred to as the molded articles of this invention) will be described next. The molded articles of this invention are those obtained by melting and molding the composition of this invention described above. In particular, those with absolute cristallinity by differential scanning calorimetry 30% or over are preferable, those with 40% or over are more preferable and those with 50% or more are even more preferable. Those with relative crystallinity by differential scanning calorimetry 80% or over are preferable and those with 90% or over are more preferable. If absolute crystallinity and relative crystallinity are less that their minimum values, hydrolysis by water that invades of diffuses cannot be prevented sufficiently and degradation under heat and humidity conditions and at the time of heat treatment cannot be sufficiently controlled.

A method of producing molded articles of aliphatic polyester resin according to this invention (hereinafter referred to as the method of this invention) is described next. The method of this invention is wherein the composition of this invention described above is melted, filled in a mold at a temperature no higher than the crystallization-initiating point by differential scanning calorimetry and no lower than the glass transition temperature and molded while crystallizing. Particularly preferable is a method wherein the composition of this invention described above is melted, filled in a mold at a temperature no higher than the crystallization-initiating temperature by differential scanning calorimetry and no lower than the crystallization-terminating temperature or the glass transition temperature and molding while crystallizing. The compound of this invention is normally melted at 170-220° C. The molding time, which is the time from when the compound is compressed into the mold of the molding apparatus until crystallization is over and it is removed from the mold, is preferably 120 seconds or shorter for practical reasons and is more preferably 60 seconds or shorter. The crystallization-initiating point, the glass transition temperature and the crystallization-terminating temperature that are necessary to keep the temperature of the mold within the range referred to above can be preliminarily obtained by differential scanning calorimetry. With the mold of the molding apparatus maintained within the aforementioned range, the melted compound of this invention can be easily crystallized and molded products with accurate dimensions can be obtained.

The molded articles obtained by the method of this invention can be further subjected to a heat treatment. The processing temperature of such a heat treatment is preferably below the aforementioned crystallization-initiating temperature and above the glass transition temperature and it is more preferable to make it above the crystallization-terminating temperature. The time of the heat treatment is preferably 5-2000 seconds. The heat treatment serves to ease the effects of molding conditions on the crystallinity and to stabilize the product quality of the molded articles. Examples of heating means for the heat treatment include electric heaters and high-frequency heaters.

The production method of this invention is not limited to injection molding. Methods like extrusion molding, blow molding, vacuum molding and compression molding are equally applicable as in the case of ordinary plastic molding.

Examples of molded articles that can be produced by the method of this invention include automobile parts such as bumpers, radiator grills, side chenille, garnishing, wheel covers, aero parts, instrument panels, door trims, seat fabrics, door handles and floor mats, housings for various household electrical equipments, water-resistant sheets, containers of all sorts and bottles.

By using the compositions of this invention, molded articles with superior physical properties can be obtained under molding conditions such as of molding cycle for general resins without deformations at the time of mold releasing.

Examples of aliphatic polyester resin composition of the invention include the following seven particular practical embodiments:

(1) Aliphatic polyester resin composition with crystallization peak temperature by differential scanning calorimetry=130.0° C. and heat of crystallization=43.8 J/g, containing 0.1 weight part of 5-barium sulfo-isophthalic acid dimethyl ester as nucleating agent for crystallization for 100 weight parts of polylactic acid resin.

(2) Aliphatic polyester resin composition with crystallization peak temperature by differential scanning calorimetry=132.2° C. and heat of crystallization=42.6 J/g, containing 1 weight part of 5-barium sulfo-isophthalic acid dimethyl ester as nucleating agent for crystallization for 100 weight parts of polylactic acid resin.

(3) Aliphatic polyester resin composition with crystallization peak temperature by differential scanning calorimetry=133.9° C. and heat of crystallization=43.1 J/g, containing 2 weight parts of 5-barium sulfo-isophthalic acid dimethyl ester as nucleating agent for crystallization for 100 weight parts of polylactic acid resin.

(4) Aliphatic polyester resin composition with crystallization peak temperature by differential scanning calorimetry=129.6° C. and heat of crystallization=42.8 J/g, containing 1 weight part of 5-barium sulfo-isophthalic acid dimethyl ester and 1 weight part of ethylene bis-12-hydroxy stearic acid amide as nucleating agent for crystallization for 100 weight parts of polylactic acid resin.

(5) Aliphatic polyester resin composition with crystallization peak temperature by differential scanning calorimetry=127.0° C. and heat of crystallization=35.8 J/g, containing 1 weight part of 5-barium sulfo-isophthalic acid dimethyl ester as nucleating agent for crystallization, 0.1 weight % of antioxidant and 1 weight % of hydrolysis depressant for 100 weight parts of polylactic acid resin.

(6) Aliphatic polyester resin composition with crystallization peak temperature by differential scanning calorimetry=127.1° C. and heat of crystallization=36.7 J/g, containing 1 weight part of 5-barium sulfo-isophthalic acid dimethyl ester as nucleating agent for crystallization for 100 weight parts of mixture of polylactic acid resin and polylactic acid based resin at weight ratio of 85/15.

(7) Aliphatic polyester resin composition with crystallization peak temperature by differential scanning calorimetry=122.1° C. and heat of crystallization=31.6 J/g, containing 1 weight part of 5-barium sulfo-isophthalic acid dimethyl ester as nucleating agent for crystallization, 11 weight % of talc, 0.1 weight % of antioxidant and 1 weight % of hydrolysis depressant for 100 weight parts of mixture of polylactic acid resin and polylactic acid based resin at weight ratio of 85/15.

Examples of the molded articles of the invention include the following embodiments:

(8) Molded articles of aliphatic polyester resin with absolute cristallinity by differential scanning calorimetry 40% or over and relative crystallinity by differential scanning calorimetry 80% or over obtainable by melt-molding aliphatic polyester resin of any of aforementioned (1)-(7).

Examples of method of the invention include the following embodiments:

(9) Methods of producing molded articles of aliphatic polyester resin by the steps of melting any of aforementioned aliphatic polyester resin compositions (1)-(7), filling it into a mold set at a temperature no higher than the crystallization-initiating temperature by differential scanning calorimetry and no lower than the glass transition temperature and molding it while it is crystallizing.

The invention is described next by way of examples in order to make its details and effects more clearly understandable but it goes without saying that these examples are not intended to limit the scope of the invention. In what follows, "parts" will mean "weight parts" and "%" will mean "weight %".

Part 1: Preparation of Aliphatic Polyester Resin Compositions

TEST EXAMPLE 1

PREPARATION OF ALIPHATIC POLYESTER RESIN COMPOSITION P-1

A mixture was obtained by using a blender to dry-blend 100 parts of polylactic acid resin (#5400 (tradename) produced by Toyota Motor Corporation. with weight average molecular weight=160000) and 0.05 parts of 5-barium sulfo-isophthalic acid dimethyl ester. This mixture was thrown into a hopper to mix and melt by means of a twin screw extruder set at 210° C. in a nitrogen atmosphere with average remaining time of 4 minutes. It was pushed out of a mold tool and cooled suddenly to obtain strands. These strands were cut by means of a cutter to obtain aliphatic polyester resin composition P-1 in the form of pellets.

TEST EXAMPLES 2-19 AND COMPARISON EXAMPLES 1-5 (PREPARATION OF ALIPHATIC POLYESTER RESIN COMPOSITIONS P-2-P-19 AND R-1-R-5)

Aliphatic polyester resin compositions P-2-P-19 and R-1-R-5 were prepared similarly as was prepared aliphatic polyester resin composition P-1. Details of their production are shown in Table 1.

TABLE 1

| | | Aliphatic polyester resin composition | | | | | | | |
|---|---|---|---|---|---|---|---|---|---|
| | | | | Nucleating agent for crystallization | | | | | |
| | | Aliphatic polyester resin | | Salt of Aromatic sulfonate | | Other nucleating agents for crystallization | | Others | |
| Example | Kind | Kind | Amount (Part) | Kind | Amount (Part) | Kind | Amount (Part) | Kind | Amount (Part) |
| Test | | | | | | | | | |
| 1 | P-1 | L-1 | 100 | C-1 | 0.1 | | | | |
| 2 | P-2 | L-1 | 100 | C-1 | 1 | | | | |
| 3 | P-3 | L-1 | 100 | C-1 | 2 | | | | |
| 4 | P-4 | L-2 | 100 | C-2 | 1 | | | | |
| 5 | P-5 | L-1 | 100 | C-1 | 1 | | | | |
| | | | | C-2 | 1 | | | | |
| 6 | P-6 | L-1 | 100 | C-1 | 0.05 | | | | |
| 7 | P-7 | L-1 | 100 | C-1 | 5 | | | | |
| 8 | P-8 | L-1 | 100 | C-1 | 1 | D-1 | 1 | | |
| 9 | P-9 | L-1 | 100 | C-1 | 1 | D-3 | 1 | | |
| 10 | P-10 | L-2 | 100 | C-1 | 1 | | | D-4 | 0.1 |
| | | | | | | | | D-5 | 1 |
| 11 | P-11 | L-2 | 85 | C-1 | 1 | | | | |
| | | L-3 | 15 | | | | | | |
| 12 | P-12 | L-2 | 85 | C-1 | 1 | D-3 | 11 | D-4 | 0.1 |
| | | L-3 | 15 | | | | | D-5 | 1 |
| 13 | P-13 | L-1 | 100 | C-3 | 1 | | | | |
| 14 | P-14 | L-1 | 100 | C-4 | 1 | | | | |
| 15 | P-15 | L-1 | 100 | C-5 | 1 | | | | |
| 16 | P-16 | L-1 | 100 | C-1 | 0.5 | | | | |
| | | | | C-3 | 0.5 | | | | |
| 17 | P-17 | L-1 | 100 | C-2 | 0.5 | | | | |
| | | | | C-3 | 0.5 | | | | |
| 18 | P-18 | L-1 | 100 | C-1 | 0.5 | | | | |
| | | | | C-4 | 0.5 | | | | |
| 19 | P-19 | L-1 | 100 | C-1 | 0.5 | | | | |
| | | | | C-2 | 0.5 | | | | |
| | | | | C-3 | 0.5 | | | | |
| Comparison | | | | | | | | | |
| 1 | R-1 | L-1 | 100 | | | D-1 | 1 | | |
| 2 | R-2 | L-1 | 100 | | | D-2 | 1 | | |
| 3 | R-3 | L-1 | 100 | | | D-3 | 10 | | |
| 4 | R-4 | L-2 | 85 | | | D-1 | 1 | | |
| | | L-3 | 15 | | | | | | |
| 5 | R-5 | L-2 | 85 | | | D-1 | 1 | D-4 | 0.1 |
| | | L-3 | 15 | | | D-3 | 10 | D-5 | 1 |

In Table 1:
L-1: Polylactic acid resin (#5400 (tradename) produced by Toyota Motor Corporation with weight average molecular weight = 160000 and amount of remnant monomers = 3300 ppm);
L-2: Polylactic acid resin (#5000 (tradename) produced by Toyota Motor Corporation with weight average molecular weight = 200000 and amount of remnant monomers = 2300 ppm);
L-3: Polylactic acid resin (PlamatePD150 (tradename) produced by Dainippon Ink and Chemicals, Inc. with weight average molecular weight = 165000);
C-1: Nucleating agent for crystallization shown by Formula 1 (5-barium sulfo-isophthalic acid dimethyl ester (TLA-114 (tradename) produced by Takemoto Yushi Kabushiki Kaisha));
C-2: Nucleating agent for crystallization shown by Formula 1 (5-calcium sulfo-isophthalic acid dimethyl ester (TLA-115 (tradename) produced by Takemoto Yushi Kabushiki Kaisha));
C-3: Nucleating agent for crystallization shown by Formula 1 (5-strontium sulfo-isophthalic acid dimethyl ester (TLA-134 (tradename) produced by Takemoto Yushi Kabushiki Kaisha));
C-4: Nucleating agent for crystallization shown by Formula 1 (5-potassium sulfo-isophthalic acid dimethyl ester (TLA-140 (tradename) produced by Takemoto Yushi Kabushiki Kaisha));
C-5: Nucleating agent for crystallization shown by Formula 1 (5-rubidium sulfo-isophthalic acid dimethyl ester (TLA-141 (tradename) produced by Takemoto Yushi Kabushiki Kaisha));
D-1: Amide based nucleating agent for crystallization (ethylene bis-12-hydroxy stearic acid amide (Slipax H (tradename) produced by Nippon Kasei Chemical));
D-2: Sulfonate based nucleating agent for crystallization (5-sodium sulfo-isophthalic acid (DELION HS (tradename) produced by Takemoto Yushi Kabushiki Kaisha));
D-3: Talc based nucleating agent for crystallization (MicroAce P-6 (tradename) produced by Nippon Talc Co., Ltd.) with average particle diameter = 4 μm);
D-4: Antioxidant agent (IRGANOX1076 (tradename) produced by Ciba Specialty Chemicals);
D-5: Hydrolysis depressant (Carbodilite HMV-8CA (tradename) produced by Nisshinbo Industries, Inc.).

Part 2 (Evaluation of Aliphatic Polyester Resin Compositions)

After each of the aliphatic polyester resin compositions in pellet forms prepared in Part 1 was dried with dehumidification at 100° C. for two hours to be made absolutely dry, a sample was obtained and its glass transition temperature, crystallization-initiating temperature, crystallization peak temperature and heat of crystallization were measured under the following conditions of differential scanning by calorimetry. The results are shown summarily in Table 2.

Conditions of Differential Scanning by Calorimetry:

Use was made of a differential scanning calorimeter (Diamond DSC (tradename) produced by Perkin Elmer Co., Ltd.) to fill the aluminum cell with 10 mg of each sample and after temperature was increased from the room temperature to 210° C. at the rate of 50° C./minute, it was held for 5 minutes and then the temperature was lowered at the rate of 20° C./minute for measurement.

TABLE 2

| | | Evaluation | | | |
|---|---|---|---|---|---|
| Examples | Kind of aliphatic polyester resin compound | Glass transition temperature (° C.) | Crystallization-initiating temperature (° C.) | Crystallization peak temperature (° C.) | Crystallization-terminating temperature (J/g) |
| Test Examples | | | | | |
| 1 | P-1 | 61.5 | 137.4 | 130.0 | 43.8 |
| 2 | P-2 | 63.4 | 138.9 | 132.2 | 42.6 |
| 3 | P-3 | 61.2 | 139.8 | 133.9 | 43.1 |
| 4 | P-4 | 63.2 | 126.7 | 120.5 | 38.7 |
| 5 | P-5 | 61.4 | 132.0 | 126.9 | 41.0 |
| 6 | P-6 | 64.2 | 133.0 | 126.5 | 45.2 |
| 7 | P-7 | 61.1 | 140.5 | 135.7 | 41.1 |
| 8 | P-8 | 61.6 | 136.9 | 129.6 | 42.8 |
| 9 | P-9 | 60.3 | 136.3 | 129.6 | 42.7 |
| 10 | P-10 | 60.7 | 135.1 | 127.0 | 35.8 |
| 11 | P-11 | 62.0 | 134.1 | 127.1 | 36.7 |
| 12 | P-12 | 60.5 | 130.2 | 122.1 | 31.6 |
| 13 | P-13 | 61.3 | 135.6 | 128.7 | 43.4 |
| 14 | P-14 | 71.5 | 136.2 | 130.1 | 42.6 |
| 15 | P-15 | 61.3 | 132.4 | 126.6 | 40.9 |
| 16 | P-16 | 63.1 | 138.7 | 131.5 | 43.9 |
| 17 | P-17 | 66.4 | 131.4 | 124.8 | 41.4 |
| 18 | P-18 | 65.9 | 134.5 | 128.4 | 41.5 |
| 19 | P-19 | 64.1 | 133.7 | 127.7 | 42.1 |
| Comparison Examples | | | | | |
| 1 | R-1 | 62.2 | 119.4 | 112.3 | 38.9 |
| 2 | R-2 | 59.8 | *1 | *1 | *1 |
| 3 | R-3 | 61.5 | 116.5 | 107.1 | 31.7 |
| 4 | R-4 | 60.5 | 116.0 | 107.2 | 27.0 |
| 5 | R-5 | 61.0 | 115.7 | 106.4 | 25.2 |

In Table 2:
*1: Numerical values could not be obtained by measurement under the given conditions of differential scanning calorimetry.

Part 3 (Production and Evaluation of Molded Articles of Aliphatic Polyester Resin)

TEST EXAMPLES 20-42 AND COMPARISON EXAMPLES 6-18

After each of the aliphatic polyester resin compositions in pellet forms prepared in Part 1 was dried with dehumidification at 100° C. for two hours to be made absolutely dry, test pieces for ISO physical properties evaluation were obtained by injection molding under the conditions shown in Table 3. After the molding process, the condition of each test piece at the time of releasing from the mold was evaluated as mold release deformation according to the standards shown below. The obtained test pieces were also used for a bending test, and deflection temperature under load and crystallinity were measured each as described below. The results are shown summarily in Table 3.

Mold Release Deformation

The manner in which each test piece is attached to the mold as it is released therefrom after the molding process and its deformation were visually evaluated according to the following standards:

A: No attachment to the mold and no deformation
B: Sticking somewhat to the mold but no deformation
C: Tending to stick to the mod and deformation is clearly present
D: Sticking to the mold to make the release difficult and deformation is significant Bending Test
Measurement was done according to ISO178.

Deflection Temperature Under Load
Measurement was done according to the test method for deflection temperature under load according to the ISO75-2B method (Flatwaise method). A bending force of 0.45 MPa is applied to each test piece in a heating bath while the temperature of a heat conducting medium is raised at a specified rate and the deflection temperature under load is the temperature of the heat conducting medium when the test piece reaches a specified level of bending.

Crystallinity (Both Absolute Crystallinity and Relative Crystallinity)

A sample of about 10 mg was taken from each test piece and placed inside an aluminum cell to measure the crystal-melting peak temperature (Tm° C.), the generated heat of crystallization ($\Delta Hc1$), absorbed heat of crystal-melting ($\Delta Hm1$) and ($\Delta Hm2$) were measured by using a differential scanning calorimeter (Diamond DSC (tradename) produced by Perkin Elmer Co., Ltd.) in the atmosphere of helium gas under the conditions described below and absolute crystallinity and relative crystallinity were calculated as below by using the measured quantities.

Conditions of Measurement (1) As preliminary measurement, temperature was raised from 30° C. to 250° C. at the rate of 5° C./minute to obtain the crystal-melting temperature peak (Tm° C.) and (T)° C. is defines by (Tm+30)° C.

(2) Temperature is increased from 30° C. to (T)° C. at the rate of 5° C./minute and the generated heat of crystallization ($\Delta Hc1$) and absorbed heat of crystal-melting ($\Delta Hm1$) which appear in the meantime are measured.

(3) It is maintained at (T)° C. for 5 minutes.

(4) Temperature is reduced from (T)° C. to 30° C. at the rate of 5° C./minute.

(5) It is maintained at 30° C. for 5 minutes.

(6) Temperature is increased from 30° C. to (T)° C. at the rate of 5° C./minute and the generated heat of crystallization ($\Delta Hm2$) which appears in the meantime is measured.

Formulas for Calculation of Crystallinity

Absolute crystallinity and relative crystallinity are calculated as follows:

$$\text{Absolute crystallinity}(\%) = 100\{(\Delta Hm1 - \Delta Hc1)/(93a/100)\}$$

$$\text{Relative crystallinity}(\%) = 100\{(\Delta Hm1 - \Delta Hc1)/\Delta Hm2\}$$

where number 93 appears because the heat of crystal-melting of polylactic acid is known to be 93 J/g according to published literature when it is 100% crystallized and factor "a" represents weight % of aliphatic polyester in the compound of this invention. In these equations, $\Delta Hc1$, $\Delta Hm1$ and $\Delta Hm2$ are absolute values and in units of J/g. When their values are obtained, situations where the crystal-melting peak temperature is clearly due to components other than aliphatic polyester are avoided as much as possible.

As can be understood from Tables 1-3, molded articles with superior physical characteristics can be obtained under same molding conditions (such as molding cycles) as for general resins without causing any deformation at the time of mold release if the compounds of this invention are used.

TABLE 3

| | | Kind of aliphatic polyester resin compound | Molding condition (Temperature (° C.)/time(sec)) | Evaluation of molded articles | | | |
|---|---|---|---|---|---|---|---|
| | | | | Evaluation at time of molding Mold release deformation | Bending test (Strength (MPa)/ Elastic ratio (MPa)) | Deflection temperature under load (° C.) | Crystallinity (Absolute (%)/relative (%)) |
| Example | | | | | | | |
| Test | 20 | P-1 | 110/40 | A | 105.2/4358 | 132.5 | 48.9/90.5 |
| | 21 | P-2 | 110/40 | A | 108.0/4447 | 124.9 | 50.7/89.7 |
| | 22 | P-3 | 110/40 | A | 108.5/4420 | 127.8 | 55.3/95.7 |
| | 23 | P-4 | 110/40 | A | 107.6/4350 | 132.9 | 53.2/92.2 |
| | 24 | P-5 | 110/40 | A | 105.6/4450 | 133.0 | 50.5/87.0 |
| | 25 | P-6 | 110/40 | A | 109.8/4470 | 130.2 | 49.0/81.0 |
| | 26 | P-7 | 110/40 | A | 108.7/4521 | 132.1 | 60.3/97.8 |
| Comp. | 6 | R-1 | 110/40 | D | *2/*2 | *2 | *2/*2 |
| | 7 | R-2 | 110/40 | D | *2/*2 | *2 | *2/*2 |
| | 8 | R-3 | 110/40 | D | *2/*2 | *2 | *2/*2 |
| Test | 27 | P-11 | 110/60 | B | 92.2/3300 | 101.2 | 47.8/95.7 |
| | 28 | P-12 | 110/60 | A | 89.9/4154 | 103.2 | 46.0/98.9 |
| Comp. | 9 | R-4 | 110/60 | D | *2/*2 | *2 | *2/*2 |
| | 10 | R-5 | 110/60 | D | *2/*2 | *2 | *2/*2 |
| Test | 29 | P-1 | 110/120 | A | 111.8/4370 | 133.3 | 50.8/93.7 |
| | 30 | P-2 | 110/120 | A | 116.7/4416 | 126.2 | 59.7/100.0 |
| | 31 | P-3 | 110/120 | A | 105.8/4486 | 130.4 | 60.2/100.0 |
| | 32 | P-4 | 110/120 | A | 106.5/4247 | 138.9 | 54.0/93.3 |
| | 33 | P-5 | 110/120 | A | 103.0/4348 | 134.5 | 48.2/85.5 |
| | 34 | P-6 | 110/120 | A | 111.8/4370 | 133.3 | 48.9/82.6 |
| | 35 | P-7 | 110/120 | A | 111.4/4598 | 134.4 | 63.9/100.0 |
| | 36 | P-8 | 110/120 | A | 101.7/4195 | 134.6 | 49.3/83.9 |
| | 37 | P-9 | 110/120 | A | 118.6/4385 | 129.7 | 50.8/84.8 |
| | 38 | P-10 | 110/120 | A | 125.4/4242 | 128.3 | 48.2/85.5 |
| | 39 | P-13 | 110/120 | A | 102.4/4436 | 129.4 | 49.7/90.7 |
| | 40 | P-14 | 110/120 | A | 99.5/4489 | 129.0 | 51.4/91.8 |
| | 41 | P-15 | 110/120 | A | 106.0/4575 | 123.8 | 48.3/89.5 |
| | 42 | P-16 | 110/120 | A | 110.6/4549 | 123.5 | 52.8/93.0 |
| | 43 | P-17 | 110/120 | A | 104.2/4475 | 133.6 | 48.3/87.9 |
| | 44 | P-18 | 110/120 | A | 109.2/4631 | 130.5 | 49.2/86.3 |
| | 45 | P-19 | 110/120 | A | 106.2/4492 | 127.2 | 50.1/89.5 |
| Comp. | 11 | R-1 | 110/120 | B | 106.6/4267 | 113.6 | 41.3/80.4 |
| | 12 | R-2 | 110/120 | D | *2/*2 | *2 | *2/*2 |
| | 13 | R-3 | 110/120 | B | 106.5/5283 | 115.0 | 42.1/80.9 |
| Test | 46 | P-11 | 110/120 | A | 95.0/3450 | 103.8 | 46.5/92.5 |
| | 47 | P-12 | 110/120 | A | 90.2/4231 | 105.5 | 47.3/100.0 |
| Comp. | 14 | R-4 | 110/120 | B | 91.2/3100 | 85.0 | 37.7/76.7 |
| | 15 | R-5 | 110/120 | B | 90.1/4266 | 99.6 | 38.0/75.0 |
| Test | 48 | P-2 | 90/40 | A | 121.4/4295 | 100.9 | 43.3/84.6 |
| | 49 | P-6 | 90/40 | B | 116.8/4210 | 100.5 | 42.7/82.0 |
| Comp. | 16 | R-1 | 90/40 | D | *2/*2 | *2 | *2/*2 |
| | 17 | R-2 | 90/40 | D | *2/*2 | *2 | *2/*2 |
| | 18 | R-3 | 90/40 | D | *2/*2 | *2 | *2/*2 |

In Table 3:
Time in molding condition: From time when aliphatic polyester resin composition is compressed into the mold of the molding device until it is crystallized and released from the mold (molding cycle)
*2: The molded article became deformed and could not be measured.

What is claimed is:

1. An aliphatic polyester resin composition, comprising a non-copolymerized mixture of a polylactic acid resin and a crystallization nucleating agent comprising a 5-M sulfo-isophthalic acid dimethyl ester which is present in a range from 0.05 to 5 parts by weight based on 100 weight parts of the polylactic acid resin, and wherein M is selected from the group consisting of potassium and barium, and wherein the composition has a crystallization peak temperature, determined by differential scanning calorimetry, greater than 120° C.

* * * * *